United States Patent [19]

Oki et al.

[11] Patent Number: 4,833,955
[45] Date of Patent: May 30, 1989

[54] CHUCK MOUNTING ARRANGEMENT

[75] Inventors: Masaru Oki, Higashiosaka; Muneki Hiraoka, Toyonaka, both of Japan

[73] Assignee: Teikoku Chuck Co., Ltd., Osaka, Japan

[21] Appl. No.: 124,022

[22] Filed: Nov. 23, 1987

[51] Int. Cl.[4] .................... B23B 19/02; B23B 5/22; B23B 5/34

[52] U.S. Cl. .................... 82/142; 279/110

[58] Field of Search .............. 82/40 R, 28 R, 30 P, 82/DIG. 6; 409/233; 29/563, 33; 279/110

[56] References Cited

U.S. PATENT DOCUMENTS

| | | | |
|---|---|---|---|
| 2,760,781 | 8/1956 | Mann | 279/41 |
| 3,868,886 | 3/1975 | bondie | 409/233 |

Primary Examiner—Eugene R. LaRoche
Assistant Examiner—Nathan W. McCutcheon
Attorney, Agent, or Firm—Wenderoth, Lind & Ponack

[57] ABSTRACT

A chuck mounting arrangement includes a chuck mounting unit fixed to the head of a spindle of a lathe and having a plurality of jaws and a scroll plate for radialy moving the jaws inwardly and outwardly. A power chuck selected from various types is inserted into the chuck mounting unit so that its adaptor will be clamped by the jaws. The scroll plate is then turned manually to move the jaws inwardly into engagement with the recessed portion formed at the rear of the adaptor. Thus the power chuck is fastened to the spindle. A drawbar mounted in the hollow spindle is provided at its front end with a joint member having its front end splitted into a plurality of joint pieces which are adapted to spread open when moving forward with their own resilience and to be pushed inwardly by a clamping sleeve provided therearound when being retracted. When the power chuck is fixed to the spindle by the chuck mounting unit, the joint pieces grip a chuck control shaft projecting from the rear end of the power chuck. The drawbar is then retracted to pull therewith the control shaft, thus moving the chuck jaws linked with the control shaft inwardly to hold firmly the work to be machined.

2 Claims, 2 Drawing Sheets

CHUCK MOUNTING ARRANGEMENT

BACKGROUND OF THE INVENTION

The present invention relates to a chuck mounting arrangement for use with a lathe or the like and comprising a manually-operated chuck mounting unit mounted on a lathe spindle to detachably mount a power chuck selected from various types.

An automatic chuck exchange arrangement is known which comprises jaws mounted on the head of a spindle provided on a headstock of a lathe and adapted to be driven e.g. hydraulically to clamp a power chuck of various types by means of the jaws. With such a prior art automatic chuck exchange arrangement, its mechanism is extremely complicated because two reciprocating shafts have to be mounted in a lathe spindle, i.e., one for driving the jaws and the other for driving the power chuck. Further it is necessary to provide a driving cylinder separately for each of the two shafts at a rear portion of the spindle.

SUMMARY OF THE INVENTION

An object of the present invention is to provide a chuck mounting arrangement which obviates the aforesaid shortcomings.

In accordance with the present invention, there is provided a chuck mounting arrangement comprising a chuck mounting unit mounted on the head of a spindle provided on a headstock of a lathe for detachably mounting a power chuck on the spindle, and a joint member provided at the head of a drawbar mounted in the spindle so as to be moved back and forth, the power chuck comprising an adaptor formed with a recessed portion at the rear portion thereof and a power chuck body having a chuck jaw control shaft projecting from the rear end thereof, the chuck mounting unit including a body, a plurality of jaws and a scroll plate for radially driving the jaws, each jaw being formed on its inner rear side with a tapered surface which functions to draw the adaptor rearwardly when the jaws are driven inwardly into engagement with the recessed portion on the adaptor, the joint member being formed at its front end with a plurality of joint pieces adapted to spread out with their own resilience in their forward stroke and to be pushed inwardly in their backward stroke so that when the adaptor and thus the power chuck are fastened to the spindle, the joint pieces will get into engagement with the chuck jaw control shaft.

By manually turning the scroll plate in a reverse direction while the spindle is not in rotation, the jaws will be shifted outwardly. In this state, the drawbar is brought to its front position by a driving cylinder with the jaws on the joint pieces spreading out.

Now, a power chuck is carried on a conveyor operated manually or by an automatic exchange unit and the rear portion of its adaptor is inserted between the jaws so that the rear end of the control shaft will be pushed into between the joint pieces. Next, the scroll plate is turned manually in the normal direction to shift the jaws inwardly into engagement with the annular recess formed in the rear portion of the adaptor, thus securing the power chuck to the chuck mounting unit by the engagement between the tapered surfaces of the jaws and the tapered shoulder of the recess.

Then, the driving cylinder provided at the rear end of the spindle is actuated to retract the drawbar with the joint member so that the joint pieces will be pressed inwardly by contact with the clamping sleeve. The contracted joint pieces bring their jaws into engagement with the groove in the control shaft to pull it back with the drawbar.

With the retraction of the control shaft, the chuck jaws of the power chuck will shift to grip a workpiece to be machined. When dismounting the workpiece and the power chuck, the driving cylinder is actuated to advance the drawbar and the scroll plate is turned in the reverse direction.

The chuck mounting unit provided on a headstock of a lathe comprises a body, a plurality of jaws adapted to radially shift their positions and a manually-operated scroll plate for driving the jaws into their operative position. Thus, it is mechanically very simple compared with a conventional automatic chuck exchange unit. Also, the arrangement of the present invention eliminates the need for determining the stop position of a chuck, thus eliminating the need for providing a detector/controller unit to stop the chuck at a predetermined position. Further, the present invention requires only one drawbar to be passed through the spindle and one cylinder to be provided at the rear end of the spindle. This also contributes to the simplicity of the mechanism.

The tapered surface formed on the inner rear side of each jaw serves to pull the adaptor of the power chuck rearwardly when the jaws are shifted inwardly by the scroll plate into engagement with the annular recess formed in the periphery of the adaptor. This assures that the power chuck can be securely fastened to the chuck mounting unit merely by shifting the jaws inwardly until they are completely inserted in the recess formed in the adaptor.

The drawbar axially movably mounted in the hollow spindle is provided at its leading end with a joint member which is driven by the driving cylinder provided at the rear part of the spindle and is provided at its end with a plurality of joint pieces adapted to spread out with its own resilience when in their forefront position and to be pressed in during their forward and backward strokes by the clamping sleeve. The power chuck is provided on its rear side with the chuck jaw control shaft extending rearwardly. The control shaft is formed with the annular recess in its rear periphery adapted to engage the jaws provided on the inner periphery of the joint pieces at their end when the power chuck is fixed to the spindle by means of the jaws of the mounting unit. With this arrangement, the movement of the jaws of the power chuck and the connection and disconnection between the control shaft and the drawbar are controlled by simply moving the joint member back and forth by means of the driving cylinder. Thus, its control mechanism is extremely simple compared to the prior art arrangements.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
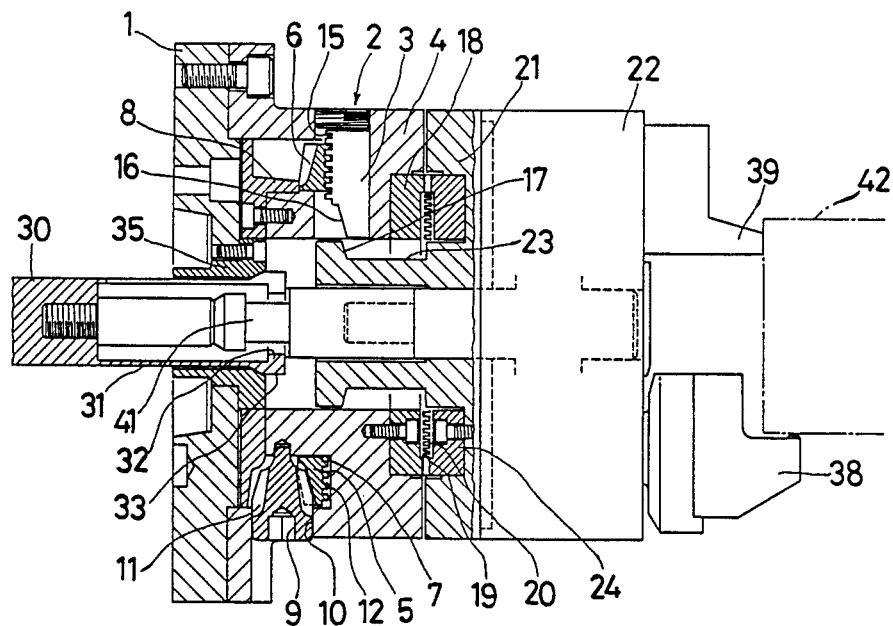
FIGS. 1 and 2 are vertical sectional side views of a portion of the arrangement of the first embodiment in accordance with the present invention, each showing a different state.
Figure 2:
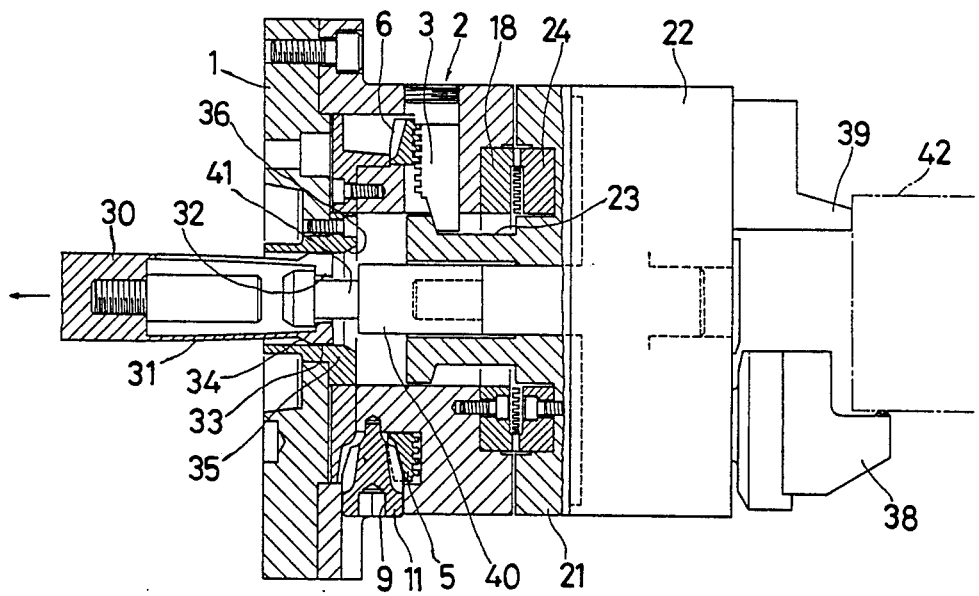

Referring to FIGS. 1 and 2 which show the first embodiment of the present invention, a chuck mounting unit 2 is provided at the front end of a flange 1 secured to the front end of the spindle of a lathe (not shown). The chuck mounting unit includes a body 4 bolted to the flange, jaws 3 and a scroll plate 5 for driving the jaws 3.

The body 4 is cylindrical and concentric with the flange 1 and is formed with an annular recess 7 concentrically in its rear end surface. The scroll plate 5 is rotatably mounted in the recess 7 and has its rear end abutting an annular support plate 8 bolted to the rear end of the body 4 so as not to shift rearwardly.

The body 4 is formed in its outer periphery near its rear end with a radially extending hole 10 reaching to the recess 7. A bevel pinion 11 having a square hole 9 in its outer end is rotatably inserted in the hole 10 so as to mesh with a bevel gear 6 formed on the rear surface of the scroll plate 5.

The scroll plate 5 is also formed with a spiral rib 12 on its front surface so as to engage in a plurality of grooves 15 formed in the rear surface of each jaw 3.

Each jaw 3 has its rear surface near its inner periphery tapered forwardly to form a slope 16. An annular coupling 18 is concentrically fixed to the front end of the body 4. The coupling 18 is formed with a radially toothed surface 19 of a trapezoidal section on its front end at its inner part.

Numeral 21 designates an adaptor to the front end of which a power chuck 22 of various types is secured as by bolting. A particular adaptor 21 can be used to clutch various types of power chucks 22. The adaptor 21 is formed at its rear with a small-diameter portion which is formed with an annular recess 23 to detachably engage the inner ends of the jaws 3. The rear shoulder portion of the recess 23 is tapered to form a slope 17 which fits the slope 16 formed on each jaw 3.

A coupling 24 is fixed to the rear end of the adaptor 21 around its inner area and is formed with radially extending teeth 20 of a trapezoidal section. The teeth 20 are put into engagement with the teeth 19 on the coupling 18 to set the power chuck 22 in position.

A joint member 30 is fixed to the leading end of a drawbar mounted in the bore in a spindle (not shown). The joint member 30 is cylindrical and is formed with a plurality of axial cuts extending from its front end rearwardly to form a plurality of resilient joint pieces 31 at its front end. Each joint piece 31 has its inner periphery at its front end inwardly protruding to form a jaw 32 and has its outer periphery at its front end outwardly protruding to form a projection 33. The rear shoulder portion 34 of the projection 33 is tapered outwardly toward the front.

The flange 1 has a clamping sleeve 35 secured to its inner periphery. The joint pieces 31 are inserted into the clamping sleeve 35 which has its inner periphery at its front end tapered to form a tapered surface 36. As the joint pieces 31 are inserted into the sleeve 35, their projections 33 will be pressed inwardly by the inner surface of the sleeve 35 as shown in FIG. 2. As the joint pieces are further pushed forward to bring their heads beyond the clamping sleeve 35, they are allowed to spread outwardly owing to their own resilience as shown in FIG. 1.

By way of example, there are shown in the drawings chuck jaws 38 and work supports 39 mounted on the front end of the power chuck 22. The jaw may have a shape other than that shown in the drawings. The chuck 22 has a chuck jaw control shaft 40 extending rearwardly from the center of its rear surface. The shaft 40 is operatively associated with the chuck jaws 38 through a link mechanism provided in the power chuck 22 so as to move the jaws 38 inwardly and outwardly all at once with the forward and rearward movement of the control shaft 40, respectively. The control shaft 40 is formed with an annular groove 41 at its rear end. The jaws 32 on the joint pieces 31 engage and disengage the groove 41.

In operation, with the spindle at standstill and the jaws 3 in the body 4 in their outermost positions, a desired power chuck 22 is inserted manually or by means of an automatic chuck exchange device (not shown) to in front of the body 4 while kept aligned with the body 4 so that the rear end of the chuck jaw control shaft 40 protruding from the chuck 22 will be pushed into the joint pieces 31 as shown in FIG. 1. In this state, the coupling 18 at the side of the body 4 and the coupling 24 at the side of the chuck 22 have their respective teeth 19 and 20 in engagement to set the chuck 22 in position.

When the annular recess 23 is brought to the position opposite to the inner ends of the jaws 3, the bevel pinion 11 is turned by a handle engaged in the square hole 9 formed in the outer end of the bevel pinion 11 to turn the scroll plate 5 through the bevel gear 6 in engagement with the bevel pinion 11 in the normal direction. Thus the jaws 3 are pushed inwardly, bringing their inner ends into engagement with the recess 23. Now the tapered surfaces 16 and 17 are in frictional engagement with each other to lock the power chuck 22 to the body 4.

With the chuck 22 locked to the body 4, a driving cylinder (not shown) is operated to retract the joint member 30.

The joint pieces 31 also retract with the retraction of the joint member 30, so that their projections 33 will be pushed inwardly by the tapered surface 36 formed on the inner periphery of the clamping sleeve 35 at its front end until the jaws 32 on their inner periphery engage in the annular groove 41 formed in the outer periphery of the control shaft 40. A workpiece 42 is then placed to abut the front end of the power chuck 22 and the joint member 30 is further retracted, bringing the jaws 32 into engagement with the rear shoulder of the groove 41 to pull back the control shaft 40, so that the chuck jaws 38 will move inwardly to grip the workpiece 42.

After the workpiece 42 has thus been gripped securely, the lathe spindle is driven to machine the workpiece 42. To dismount the workpiece 42 after machining, the spindle is brought to a stop and the control shaft 40 is moved forward to spread the chuck jaws 38 of the power chuck 22. After dismounting the workpiece 42, the joint pieces 31 are further advanced, bringing their head projections 33 ahead of the front end of the clamping sleeve 35 so as to spread them open and release the engagement between the jaws 32 on the joint pieces 31 and the groove 41 in the control shaft 40.

Next, the handle is set in the square hole 9 in the outer end of the bevel pinion 11 to turn the scroll plate 5 in the reverse direction through the bevel gear 6 formed thereon. With the reverse turn of the scroll plate, the jaws 3 are shifted outwardly, disengaged from the recess 23 in the power chuck 22, thus allowing the replacement of the power chuck 22.

Figure 3:
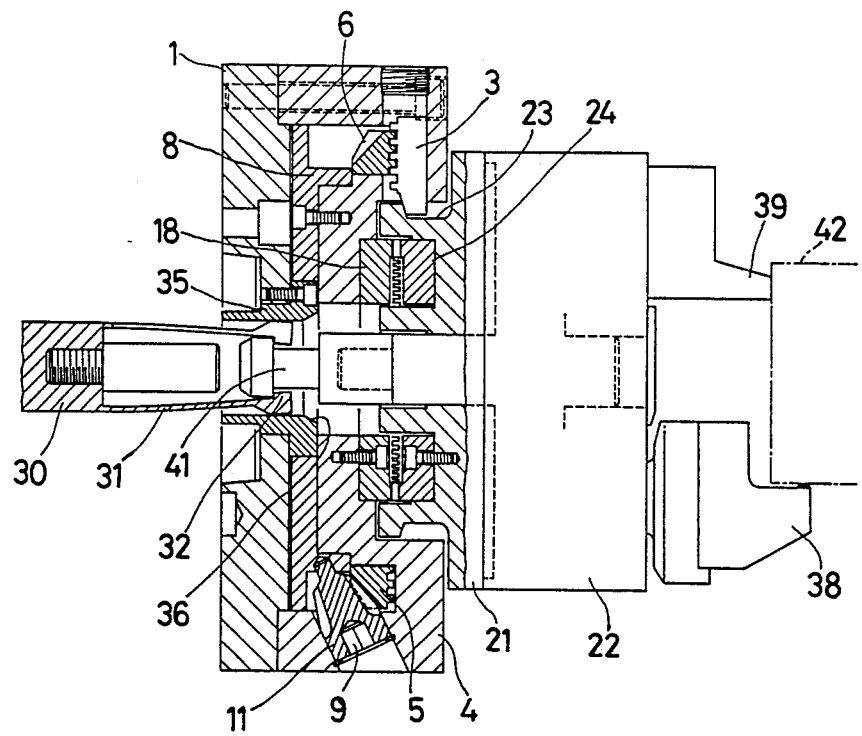
FIG. 3 is a similar view of a portion of the arrangement of the second embodiment.

FIG. 3 shows the second embodiment of the present invention in which the bevel pinion 11 is mounted obliquely in the body 4 and the body has the same diameter as that of the flange 1 and has its length shortened to reduce the entire overhang. Otherwise, this embodiment is substantially the same as the first one.

Figure 4:
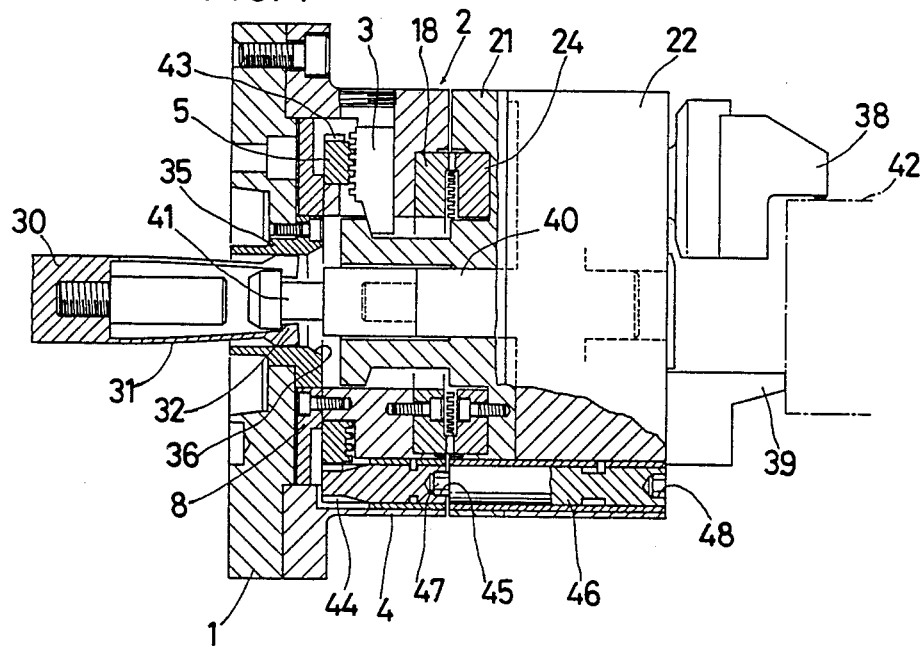
FIG. 4 is a similar view of a portion of the arrangement of the third embodiment.

FIG. 4 shows the third embodiment in which the scroll plate 5 is provided with a spur gear 43 on its outer periphery. A pinion gear 44 for engagement with the spur gear 43 is rotatably mounted in an axial hole formed in the body 4 near its outer periphery and is provided with a pin to stop it from slipping out of the hole. The pinion gear 44 is formed with a square hole 45 in its outer end.

The adaptor 21 and the power chuck 22 are also formed with axial holes at portions near their outer periphery to receive a shaft 46 rotatably therein. The shaft 46 is formed on its rear end with a square projection 47 adapted to be received in the square hole 45 in the outer end of the pinion gear 44 and is formed in its front end with a square hole 48. A stopper pin is provided to stop the shaft 46 from coming off. Other structures and functions are substantially the same as those of the first and second embodiments.

In this embodiment, before mounting the power chuck 22, a handle is inserted in the square hole 45 in the pinion gear 44 to turn the scroll plate 5 through the spur gear 43 and shift the jaws 3 outwardly or inwardly.

Once the power chuck 22 has been fixed to the body 4, the square shaft of the handle is inserted in the square hole 48 in the outer end of the shaft 46 which now appears on the front surface of the power chuck 22 to turn the pinion gear 44 through the engagement between the square projection 47 on the shaft 46 and the square hole 45 in the pinion gear 44.

What is claimed is:

1. A chuck mounting apparatus comprising:
   a chuck mounting unit mountable to a drawbar of a lathe, said chuck mounting unit including
   (a) a body;
   (b) a plurality of jaws movably attached to said body, and each one of said plurality of jaws having a tapered engaging surface for engaging a recessed portion on an adaptor for locking said jaws and an adaptor together for rigidly coupling a power chuck to said chuck mounting unit;
   (c) a scroll plate rotatably attached to said body;
   (d) means on said scroll plate for driving said plurality of jaws when said scroll plate is rotated;
   (e) means attached to said body for rotating said scroll plate; and
   (f) a joint member movably attached to said body of said chuck mounting unit, said joint member having means thereon for mounting to a drawbar of a lathe, a plurality of movable joint pieces attached to said joint member, and means on said joint member for moving said joint pieces for causing said joint pieces to engage and move a chuck jaw control shaft when said joint member is moved by a drawbar of a lathe; and
   a power chuck detachably mounted on said chuck mounting unit, said power chuck including
   (a) a power chuck body;
   (b) an adaptor attached to said power chuck body, means attached to said adaptor for detachably mounting said power chuck body on said body of said chuck mounting unit, and a recessed portion on said adaptor for engaging each one of said tapered engaging surfaces of said plurality of jaws of said chuck mounting unit for locking said adaptor and said jaws together for rigidly coupling said power chuck to said chuck mounting unit;
   (c) a plurality of chuck jaws movably attached to said power chuck body for holding a workpiece therebetween; and
   (d) a chuck jaw control shaft movably attached to said power chuck body, and means on said chuck jaw control shaft for moving said plurality of chuck jaws for holding a workpiece when said plurality of movable joint pieces of said joint member engage and move said chuck jaw control shaft when a drawbar of a lathe is mounted to and moves said joint member.

2. An apparatus as in claim 1, wherein said means attached to said body of said chuck mounting unit for rotating said scroll plate is a bevel pinion.

* * * * *